(12) United States Patent
Wang et al.

(10) Patent No.: US 9,743,327 B2
(45) Date of Patent: Aug. 22, 2017

(54) MANAGING RADIO TRAFFIC LOAD

(71) Applicant: Telefonaktiebolaget LM Ericsson (publ), Stockholm (SE)

(72) Inventors: Yu Wang, Solna (SE); Konstantinos Dimou, San Francisco, CA (US); Fredrik Gunnarsson, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/030,472

(22) PCT Filed: Nov. 1, 2013

(86) PCT No.: PCT/SE2013/051284
§ 371 (c)(1),
(2) Date: Apr. 19, 2016

(87) PCT Pub. No.: WO2015/065258
PCT Pub. Date: May 7, 2015

(65) Prior Publication Data
US 2016/0242088 A1 Aug. 18, 2016

(51) Int. Cl.
*H04W 36/00* (2009.01)
*H04W 36/22* (2009.01)
(Continued)

(52) U.S. Cl.
CPC ............. *H04W 36/22* (2013.01); *H04L 47/29* (2013.01); *H04W 4/005* (2013.01);
(Continued)

(58) Field of Classification Search
CPC . H04W 36/22; H04W 4/005; H04W 28/0284; H04W 28/0226; H04W 24/10; H04L 47/29
(Continued)

(56) References Cited

U.S. PATENT DOCUMENTS

2010/0323698 A1* 12/2010 Rune ............... H04W 48/06
455/436
2012/0039171 A1* 2/2012 Yamada ............... H04L 47/12
370/232
(Continued)

FOREIGN PATENT DOCUMENTS

| EP | 1058473 A1 | 12/2000 |
|---|---|---|
| WO | 2014053979 A2 | 4/2014 |
| WO | 2014102657 A2 | 7/2014 |

OTHER PUBLICATIONS

3rd Generation Partnership Project, "3rd Generation Partnership Project; Technical Specification Group Radio Access Network; Evolved Universal Terrestrial Radio Access Network (E-UTRAN); X2 application protocol (X2AP) (Release 11)", Technical Specification, 3GPP TS 36.423 V11.6.0, Sep. 1, 2013, pp. 1-144, 3GPP, France.
(Continued)

Primary Examiner — Khai M Nguyen
(74) Attorney, Agent, or Firm — Coats & Bennett, PLLC

(57) ABSTRACT

Method in and network node (700; 140a, 111a, 131a, 110a-c, 130a-c) of a wireless communications system (100a-c), for managing radio traffic load in a first cell (115a-c). The first cell (115a-c) is served by a first base station (110a-c) and is at least partly is covered by a second cell (135a-c) served by the first base station (110b) or a second base station (130a,c). Information is obtained (201, 601) about a future load of radio traffic in the first cell (115a-c). The future load is associated with a first group of wireless devices (120a-d) and generation of the future load is in response to an occurrence of a future event. It is then provided (202, 602), based on the obtained information, a change of serving cell so that at least one wireless device (121a) of a second group of one or more wireless devices (121a-b) being served in the first cell (115a-c) by the first
(Continued)

base station (110*a-c*), instead become served in the second cell (135*a-c*).

19 Claims, 7 Drawing Sheets

(51) Int. Cl.
*H04W 4/00* (2009.01)
*H04W 28/02* (2009.01)
*H04L 12/801* (2013.01)
*H04W 24/10* (2009.01)

(52) U.S. Cl.
CPC ... *H04W 28/0226* (2013.01); *H04W 28/0284* (2013.01); *H04W 24/10* (2013.01)

(58) Field of Classification Search
USPC .................................. 455/436, 437, 438, 443
See application file for complete search history.

(56) References Cited

U.S. PATENT DOCUMENTS

| | | | |
|---|---|---|---|
| 2013/0083653 A1 | 4/2013 | Jain et al. | |
| 2014/0274064 A1* | 9/2014 | Al-Shalash | H04W 24/08 455/437 |
| 2015/0189532 A1* | 7/2015 | Dimou | H04W 28/021 455/418 |
| 2015/0189550 A1* | 7/2015 | Harrang | H04W 28/08 455/405 |
| 2015/0237529 A1* | 8/2015 | Nylander | H04W 28/08 370/230 |
| 2016/0366565 A1* | 12/2016 | Fjelberg | H04W 4/08 |

OTHER PUBLICATIONS

3rd Generation Partnership Project, "3rd Generation Partnership Project; Technical Specification Group Radio Access Network; Evolved Universal Terrestrial Radio Access Network (E-UTRAN); S1 Application Protocol (S1AP) (Release 11)", Technical Specification, 3GPP TS 36.413 V11.5.0, Sep. 1, 2013, pp. 1-171, 3GPP, France.

Jung, I., et al., "IEEE 802.16p Machine to Machine (M2M) System Requirements Document (SRD) (initial working document revised)", Sep. 29, 2011, pp. 1-7, IEEE.

ETSI Technical Commitee Machine-to-Machine Communications, "Machine-to-Machine communication (M2M); M2M service requirements", Technical Specification, ETSI TS 102 689 V1.1.1, Aug. 1, 2010, pp. 1-34, ETSI.

3rd Generation Partnership Project, "3rd Generation Partnership Project; Technical Specification Group Services and System Aspects; Service requirements for Machine-Type Communications (MTC); Stage 1 (Release 11)", Technical Specification, 3GPP TS 22.368 V11.6.0, Sep. 1, 2012, pp. 1-21, 3GPP, France.

* cited by examiner

MANAGING RADIO TRAFFIC LOAD

TECHNICAL FIELD

Embodiments herein relate to a method in a wireless communications system, such as a telecommunications system, and to a network node in the wireless communications system, for managing radio traffic load in a cell served by a base station.

BACKGROUND

Communication devices such as wireless devices may be also known as e.g. user equipments (UEs), mobile terminals, wireless terminals and/or mobile stations. A wireless device is enabled to communicate wirelessly in a cellular communications network, wireless communications system, such as a telecommunications system, or radio communications system, sometimes also referred to as a cellular radio system, cellular network or cellular communications system. The communication may be performed e.g. between two wireless devices, between a wireless device and a regular telephone and/or between a wireless device and a server via a Radio Access Network (RAN) and possibly one or more core networks, comprised within the cellular communications network. The wireless device may further be referred to as a mobile telephone, cellular telephone, laptop, Personal Digital Assistant (PDA), tablet computer, just to mention some further examples. The wireless device may be, for example, portable, pocket-storable, hand-held, computer-comprised, or vehicle-mounted mobile device, enabled to communicate voice and/or data, via the RAN, with another entity, such as another wireless device or a server.

The cellular communications network covers a geographical area which is divided into cell areas, wherein each cell area is served by at least one base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided according to a Radio Access Technology (RAT) and at a carrier frequency by the base station at a base station site. The base station may support one or several communication technologies, such as RATs. Cells may overlap so that several cells cover the same geographical area. By the base station serving a cell is meant that the radio coverage is provided such that one or more wireless devices located in the geographical area where the radio coverage is provided may be served by the base station. One base station may serve one or several cells. When one base station serves several cells, these may be served according to the same or different RATs, and/or may be served at same or different carrier frequencies. The base stations communicate over the air interface operating on radio frequencies with the wireless device within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Special Mobile). In 3rd Generation Partnership Project (3GPP) Long Term Evolution (LTE), base stations, which may be referred to as eNodeBs or eNBs, may be directly connected to other base stations and may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Moreover, the 3GPP has undertaken to evolve further the UTRAN and GSM based radio access network technologies, for example into evolved UTRAN (E-UTRAN) used in LTE.

The expression downlink (DL) is used for the transmission path from the base station to the wireless device. The expression uplink (UL) is used for the transmission path in the opposite direction i.e. from the wireless device to the base station.

Massive deployment of wireless sensors has, and is increasingly, taken place in particular 3GPP networks. The type of communication generated by such devices is termed Machine To Machine (M2M) communication or Machine Type Communication (MTC). The devices typically do not use a lot of power and since they are required to be of low cost, they typically do not have advanced processing chains either in the transmitter or in the receiver part. Information on M2M & MTC may e.g. be found in:

Institute of Electrical and Electronics Engineers (IEEE) 802.16p-10/0004r3 "IEEE 802.16p Machine to Machine (M2M) System Requirements Document (SRD)" (2011-10-09), Technical Specification (TS) 22.368 V11.6.0 "3rd Generation Partnership Project; Technical Specification Group Services and System Aspects; Service requirements for Machine-Type Communications (MTC); Stage 1" (Release 11), and European Telecommunications Standards Institute (ETSI) TS 102 689 V1.1.1 (2010-08) "Machine-to-Machine communications (M2M); M2M service requirements". These documents i.a. specify communication between Machine Type Devices (MTDs) without human interaction for the sake of control, automation and other functions. Radio traffic generated by MTDs, such as wireless sensors of the above kind, i.e. including M2M communication and MTC, will thus cause load in the wireless communications systems where they are deployed, e.g. LTE based wireless communications systems, and in cells thereof. This load is in addition to load resulting from more conventional radio traffic. More conventional radio traffic refers to radio traffic generated by wireless devices associated with human users. Hence, the additional load from radio traffic, i.e. radio traffic load, generated from MTDs has to be taken care of and dealt with in wireless communications systems.

SUMMARY

An object is to provide improvements with regard to managing radio traffic load generated from MTDs.

According to a first aspect of embodiments herein, the object is achieved by a method in a wireless communications system, for managing radio traffic load in a first cell. The first cell is served by a first base station and is at least partly covered by a second cell served by the first base station or a second base station. The wireless communications system obtains information about a future load of radio traffic in the first cell. The future load is associated with a first group of wireless devices and generation of the future load is in response to an occurrence of a future event. The wireless communications system then provides, based on the obtained information, a change of serving cell so that at least one wireless device of a second group of one or more wireless devices being served in the first cell by the first base station, instead become served in the second cell by the first base station or the second base station.

According to a second aspect of embodiments herein, the object is achieved by a network node for managing radio traffic load in a first cell. The first cell is served by a first base station and is at least partly covered by a second cell served by the first base station or a second base station. The network node, first base station and second base station are comprised in a wireless communications system. The network node comprises an obtaining circuitry, configured to obtain information about a future load of radio traffic in the first cell. The future load is associated with a first group of wireless devices and generation of the future load is in response to an occurrence of a future event. The network node further comprises a providing circuitry, configured to provide, based on the obtained information, a change of serving cell so that at least one wireless device of a second group of one or more wireless devices being served in the first cell by the first base station instead become served in the second cell by the first base station or the second base station.

The first group of wireless devices may comprise or correspond to the MTDs. Hence, the first cell become offloaded by utilizing the overlapping second cell and is thereby enabled to better handle said future load of radio traffic generated by the MTDs when said future event occurs.

Radio traffic load in a cell is load caused by radio traffic in the cell. Each cell, or rather a base station for serving the cell, in a radio access network has limited capacity for managing radio traffic in the cell and will thus be more or less loaded when there is radio traffic being managed by the cell. Radio traffic load typically manifests in occupation of limited resources, associated with the cell, for managing the radio traffic and provide a quality of service.

Future event is used herein to refer to an event that has not yet taken place, but that with some likelihood may or even will occur later on but at point in time that may be unknown. Hence the future load may be considered to be a potential and/or additional load that may occur. The future event may e.g. be a force major event, or any other major or general event that is excepted to trigger the first group of wireless devices, e.g. MTDs, to generate traffic and/or connecting or at least trying to connect to the first cell. Earthquakes or tsunamis may be more extreme examples of future events that may be relevant.

In some embodiments, the first group of wirelesses devices may comprises at least a subgroup of wireless devices disconnected from the first base station. The future load may comprise traffic resulting from said subgroup connecting or at least attempting to connect to the first base station in response to the occurrence of said future event.

Disconnected from the first base station typically means also disconnected from the wireless communications system. A wireless device being disconnected from the first base station means that it is fully or partly invisible to the first base station and/or the wireless communications system. A fully invisible wireless device means that there is no communication, at least not in the uplink, between the first base station and the wireless device. This typically also includes that there is no possibility for the wireless communications system to initiate setting up a connection, or even initiate setting up any communication, with the disconnected wireless device. A partly invisible wireless device means that there may be limited communication, e.g. involving only one way communication in the downlink, between the first base station and the wireless device. This may e.g. include wireless devices that are in so called idle mode.

Hence, embodiments herein enable offloading with regard to future load from currently disconnected wireless devices. Thereby reducing the risk of future congestion and even denial of service to wireless devices connected or attempting to connect to the first base station in response to occurrence of the future event.

In some embodiments, the first cell is served by the first base station according to a first RAT and the second cell is served by the first base station, or the second base station, according to a second RAT that is different from the first RAT. The second RAT may advantageously be based on WFi, i.e. based on the IEEE 802.11 standards. Hence another RAT, although it may not be supported by the first group of wireless devices, e.g. MTDs, may be used to be able to provide better service to the first group of wireless devices, e.g. MTDs, in case of occurrence of the future event.

In some embodiments, the provision of the change of serving cell is accomplished by configuring a load balancing algorithm, which as such may be a conventional load balancing algorithm e.g. such that conventionally may be used between different RATs, so that said future load is taken into account by the load balancing algorithm. This enables simple and cost efficient implementation of embodiments herein.

BRIEF DESCRIPTION OF THE DRAWINGS

Examples of embodiments herein are described in more detail with reference to the appended schematic drawings.

DETAILED DESCRIPTION

Figure 1A:
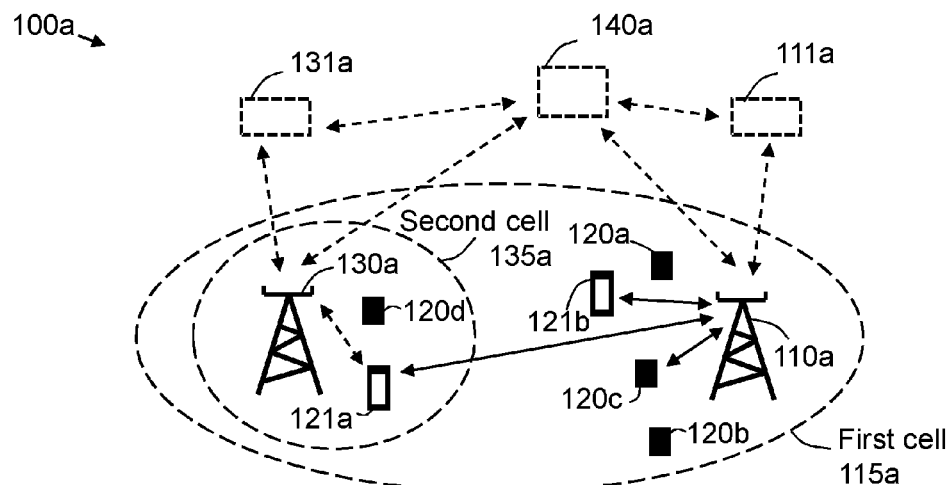
FIG. 1a-c are schematic block diagrams depicting example of wireless communications systems in relation to which the embodiments herein are explained.

Before presenting embodiments herein and as part of the development towards embodiments herein, the situation and problem indicated in the Background will be further discussed.

As indicated above, an increasing and large number of MTDs, including wireless sensors, may reside in the coverage area of a cell of a wireless communications system, e.g. a LTE-based wireless communications system. The wireless sensors may e.g. comprise emergency sensors that generate warning in case of e.g. earthquake, fire and/or flood. Most the MTDs are expected to be of relative low cost, designed for low power consumption and supporting only one RAT. Under certain circumstances, e.g. earthquake, or tsunami, many of these MTDs may start generating traffic more or less simultaneously and result in a sudden increase and/or peak of radio traffic in the cell they are located in and thereby generate a great sudden and additional load in the cell. Radio traffic load in a cell is load caused by radio traffic in the cell, i.e. radio traffic to and/or from wireless devices located in the cell and communicating with the base station serving the cell. Each cell, or rather a base station for serving the cell, in a wireless communications system has limited capacity for managing radio traffic in the cell and will thus be more or less loaded with respect to the cell when there is radio traffic being managed by the cell. Radio traffic load typically manifests in occupation of limited resources, associated with the cell, for managing the radio traffic and provide a quality of service with regard to wireless devices located in the cell and communicating with the base station serving the cell. Exact what kind of radio traffic load that will be limiting for managing the radio traffic and provide a certain quality or service may differ from case to case and e.g. be depending on the RAT. For example, some RATs may in some situations be limited by the number of different wireless devices being connected or trying to connect at approximately the same time, e.g. owing to that resources for handling this are not sufficient and/or not able to deal too many new connections sufficiently fast. In other situations and/or RATs, it may be the total amount of radio traffic in the cell, i.e. bandwidth, that is limiting. In any case, in particular when a cell is already loaded by connected wireless devices, such as conventional wireless devices associated with human users, and additional load from MTDs suddenly occur, it is a great risk that the cell will get overloaded or congested, resulting in problem for the wireless communications system to provide a sufficient quality of service, or even any service at all, for some or all of the wireless devices located in the cell. It is evidently not desirable and may even cause danger to health and even life of humans if wireless devices, e.g. wireless sensors, that demand a connection to and service provided by the wireless communications system, are denied this, in particular in a crisis situation.

Load balancing between two cells that are at least partly overlapping and e.g. support different RATs, typically considers only ongoing traffic in the networks from active terminals, i.e. wireless devices that are connected to the wireless communications system and generate traffic in the cell. However, in the case of MTDs as discussed above, a problem is that many, or even most, such devices most of the time may be in idle mode or sleep mode, making them at a given point or period in time fully or partly "invisible" to the wireless communications system and/or base station serving a cell that they will attempt to connect to at some later point in time.

Also, the link budget dictating communication from MTDs is expected to be different than for conventional type of wireless devices and what hitherto may have been considered normal for radio links between base stations and wireless devices. For example, the range of links for MTDs is expected to be much shorter than the range of more conventional and what at least previously have been considered typical radio links.

Moreover, at least at the beginning of mass deployment of MTDs, such as wireless sensors, no massive deployment of additional base stations, such as macro, or pico, or relay nodes, is expected in order to provide sufficient service to MTDs in particular. Therefore, it may be common with MTDs in areas with poor coverage and with no extra capacity added for taking care of radio traffic from MTDs.

Furthermore, in most of the cases, the MTDs are expected to be static, i.e. they reside in one and the same position most of the time, typically at the same position where they were initially deployed in the wireless communications system and where they typically also were tested to be operative, including e.g. tested to be able to connect to the wireless communications system.

In addition, traffic from MTDs is expected to be mainly on the uplink, which is a quite challenging radio link. Compare this to more conventional, human user oriented wireless devices, that are associated with traffic mainly in the downlink. In order to provide error-free communication in this challenging radio link, several solutions may be considered, e.g. longer Transmission Time Intervals (TTIs), advanced receivers at the base stations, etc. Another solution, already mentioned, to combat poor link budgets may be massive deployment of small base stations, such as pico, femto-base station, or relay nodes in areas close to hotspots of wireless sensors.

Another ongoing development is deployment of other and additional RATs such as IEEE based technologies, e.g. WiFi or WLAN, operating in unlicensed spectrum, and that exists in parallel and with at least partly overlapping coverage areas, or cells, with RATs such as LTE.

The information compiled above have been utilized in the development towards embodiments herein that are described below.

FIG. 1a is a schematic block diagram depicting an example of a first wireless communications system 100a, in relation to which the embodiments herein will be explained. The first wireless communications system 100a comprises a first base station 110a serving a first cell 115a and a second base station 130a serving a second cell 135a. The first wireless communications system 100a may be as described above and respectively support one or more Radio Access Technologies (RATs). For example, in some embodiments the first base station 110a and first cell 115a is according to a different RAT than the second base station 130a and second cell 135a. For example, if the RAT of the first base station 110a is LTE, the RAT of the second base station 130a may be WiFi that will be further explained separately below.

A first group of wireless devices 120a-d are shown located in the first cell 115a. The first group of wireless devices 120a-d may be MTDs, as described in the background, such as wireless sensors, and may e.g. support only one RAT, here the RAT of the first base station 110a that is serving the first cell 115a. The wireless devices 120a-d are typically disconnected from the first base station 110a and thus are partly or fully "invisible" for the first base station 110a and/or the first wireless communications system 100a. A fully invisible wireless device, e.g. wireless device 120a, typically means that there is no communication at all, but at least not in the uplink, between the first base station 110a and the wireless device 120a. This typically also includes that there is no possibility for the first wireless communications system 100a to initiate setting up a connection, or even initiate 2-way communication, with the disconnected wireless device. A partly disconnected wireless device, e.g. wireless device 120b, means that there may be limited communication, e.g. involving only one way communication in the downlink, between the first base station 110a and the wireless device 120a. This may e.g. include wireless devices that are in so called idle mode. Although all or most of the first group of wireless devices 120a-d may be disconnected, the first group of wireless devices 120a-d may also comprise one or more wireless devices, e.g. wireless device 120c, that are connected and thus may be served in the first cell 115a by the first base station 110a, although this may be only occasionally and/or for a more limited period of time and/or from a more static location, compared to what is typically is the case for a conventional wireless device associated with a human user.

A second group of wireless devices 121a-b are also shown located in the first cell 115a. The second group of wireless devices 121a-b may be conventional wireless devices associated, at least more directly, with a human user compared to a MTD. The wireless devices 121a-b of the second group are typically connected to the first base station and may be served in the first cell 115a by the first base station 110a. Further, one or more of the wireless devices if the second group of wireless devices 121a-b may support multiple RATs, e.g. a first RAT of the first base station 110a that is serving the first cell 115a and a second, different RAT, of the second base station 130a that is serving the second cell 135a.

The first wireless communications system 100a may comprise a first managing node 111a that manages traffic to and/or from the first base station 110a. For example, if the RAT of the first base station 110a is LTE, the managing node 111 may correspond to a Mobility Management Entity (MME) and if the RAT of the first base station 110a is UMTS, the managing node 111 may correspond to a RNC. Moreover, the first wireless communications system 100a may comprise a second managing node 131a that manages traffic to and/or from the second base station 130a. For example, if the RAT of the second base station 130a is WiFi, the managing node 111 may correspond to a server and/or router. In the case of WiFi, the second base station 130a may correspond to one or more WiFi transmitters, e.g. comprised in WiFi Access Points (APs), that are managed, and may also be controlled, by the server and/or router. The first wireless communications system 100a may also comprise a first network node 140a for performing a method according to embodiments herein. The first network node 140a may be separate from other network nodes but may also be comprised in or correspond to a node having also other functionality and purpose. For example, in some embodiments the network node 140a may be comprised in or correspond to the first or second managing nodes 111a, 131a or the first or second base station 110a, 130a. When the first network node 140a is separate network node it may be a network node pertaining to a RAT of the first base station 110a-c or of the second base station 110a-c, or the first network node may be separate and not part, and e.g. not defined, by any RAT of the first base station 110a and/or second base station 130a.

Still referring to FIG. 1a, attention is drawn to that it shows a scenario where the second cell 135a is comprised in the first cell 115a and not all wireless devices are located in the second cell 135a. In the shown example, only the wireless devices 121a and 120d are located also in the second cell 135a.

Figure 1B:
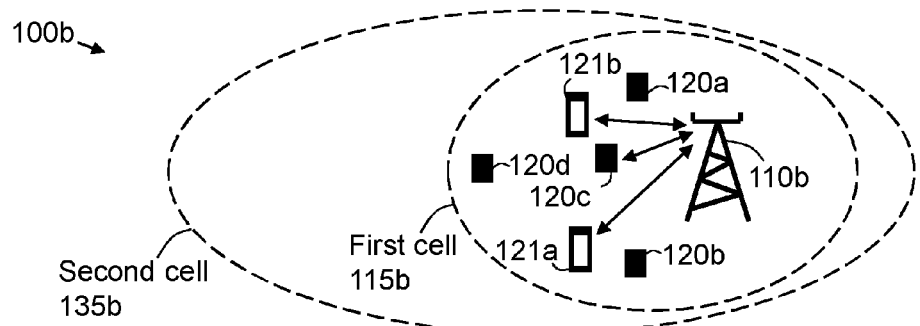
Figure 1C:
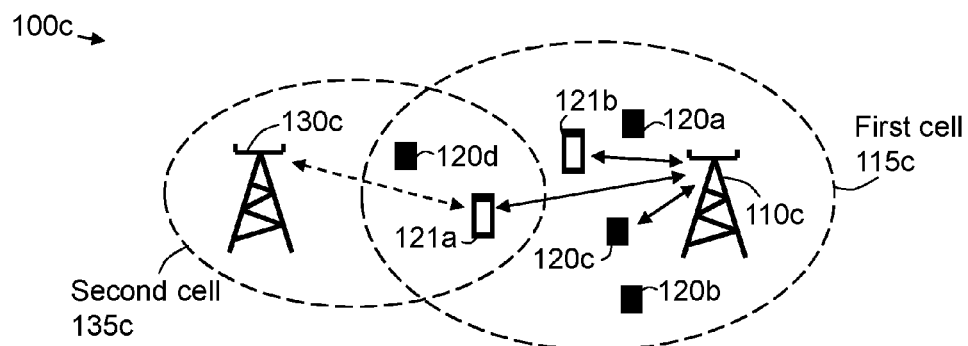

FIGS. 1b-c are schematic block diagrams depicting a second wireless communications system 100b and a third wireless communications system 100c, respectively, that each may correspond to the first wireless communications system 100a discussed above but with differences that will be described below. Additionally, each of first base stations 110b-c may correspond to the first base station 110a, each of first cells 115b-c may correspond to the first cell 115a. Also, each second cells 135b-c may correspond to the second cell 135a. To simplify comparison, the same groups of wireless devices 120a-d, 121a-b, are depicted in FIGS. 1a-c. Note that in FIG. 1b there is no second base station corresponding to the second base station 130a in FIG. 1a. Instead the first base station 110b serves also the second cell 135b. However, in FIG. 1c, there is a second base station 130c that may correspond to the second base station 130a. Further differences between FIGS. 1a-c are the relative cell coverage of the first and second cells 115a-c, 135a-c and also the location of the wireless devices in the first and second cells 115a-c, 135a-c. Note that nodes corresponding to the first managing node 111a, the second managing node 131a and the first network node 140a shown in FIG. 1a, have been left out in FIGS. 1b-c, although nodes corresponding to these may likewise be comprised in the second and third wireless communications systems 100b-c. Reason for this is to reduce details in the figure and put better focus on differences. The differences between the figures are for illustrating and showing different scenarios compatible with embodiments herein, and will be further described below.

FIG. 1b shows a scenario where the first cell 115b is comprised in the second cell 135b. Both the first group of wireless devices 120a-d and the second group of wireless devices 120a-d are thus also located in the second cell 135b.

FIG. 1c shows a scenario where the first cell 115c and second cell 135c are partially overlapping, where the second cell 135c is partially covering the first cell 115c. In the shown example of FIG. 1c, only the wireless devices 121a and 120d are located also in the second cell 135b.

Attention is drawn to that how the first cells 115a-c and second cells 135a-c may overlap each other, i.e. partially or either one fully comprised in the other, is independent on whether there is only one base station serving both cells, as in illustrated in FIG. 1b, or whether there is a second base station serving the second base station, as illustrated in FIG. 1a, 1c. Hence, for example, although not explicitly illustrated herein, there may be wireless communications systems, relevant for embodiments herein, that corresponds to the first wireless communications system 100a shown in FIG. 1a but with no second base station 130a and instead the first base station 110a serving also the second cell 135a etc. However, in such case the second cell 135a would of course be comprising or at least be adjacent the first base station 110a and not located at a distance therefrom as shown in FIG. 1b.

Note that the nodes and base stations described above are logical nodes in the wireless communications systems 100a-c and that a logical node may be comprised in the same physical unit as other logical nodes.

Attention is again drawn to that FIGS. 1a-c are only schematic and for exemplifying purpose. The respective radio communications system 100a-c may, and typically will, in reality comprise several further cells, base stations, wireless devices, network nodes etc., as realized by the skilled person, but which are not shown herein for simplicity.

For convenient presentation will in the below mainly the first wireless communications system 100a, and nodes and base stations comprised therein, be used in examples to follow. However, as should be realized from the above, references to the first wireless communications system 100*a* may be replaced by any one of the second and third wireless communications systems 100*b-c*, and the any nodes and base stations comprised in the first wireless communications system 100*a* may be replaced by corresponding nodes and base stations in the second and third wireless communications systems 100*b-c*.

In some embodiments the first base station 110*a* serves the first cell 115*a* according to a first RAT, and the second base station 130*a*, or the first base station 110*a*, serves the second cell according to a second RAT that is different from the first RAT. For example, the first RAT may be LTE and the second RAT may be WiFi. Note that overlapping cells, i.e. geographically overlapping in radio coverage, and even adjacent cells, advantageously, and typically also in practice, are served at different radio frequencies including different carrier frequencies. This is typically the case also for embodiments herein, both when the cells are served according to the same RAT and different RATs. The reason for different frequencies being used by overlapping and adjacent cells is of course to keep crosstalk and disturbances between the cells low. In the case of different RATs this is typically taken care of by that a total radio frequency spectrum typically has been split into sub-ranges that each is allocated for use by a respective single RAT. Hence cells of different RATs will typically be at different carrier frequencies. However, it is also possible, including for embodiments herein, to have overlapping cells of different RATs that fully or partly are at the same frequencies. For example, how the RATs differ may allow for separation of the cells even when these are served using frequencies that are overlapping, or that one RAT may allow for incorporation of the other RAT.

Examples of embodiments herein relating to a method in the first wireless communications system 100*a*, which method in the example is shown performed by the first network node 140*a*, for managing radio traffic load in the first cell 115*a*, will now be described with reference to the combined signaling diagram and flowchart depicted in FIG. 2. As discussed above, the first cell 115*a* is at least partly covered by the second cell 135*a*. Note that this is true also in case of the first cells 115*b-c* and second cells 135*b-c* of the second and third wireless communications systems 100*b-c*.

The method comprises the following actions, which actions may be taken in any suitable order. Further, actions may be combined.

Action 201

The first network node 140*a* obtains information about a future load of radio traffic in the first cell 115*a*, which future load is associated with the first group of wireless devices 120*a-d*. Generation of the future load is in response to an occurrence of a future event.

Load of radio traffic, or radio traffic load, was discussed in the foregoing. Future event refers to an event that has not yet taken place, but that with some likelihood may or even will occur later on but at point in time that may be unknown. Hence the future load may be considered to be a potential and/or additional load that may occur. The future event may e.g. be a force major event, or any other major or general event that is excepted to trigger the first group of wireless devices, e.g. MTDs, to generate traffic and/or connecting or at least trying to connect to the first cell. Earthquakes or tsunamis may be more extreme examples of future events that may be relevant.

In some embodiments, the first group of wirelesses devices 120*a-d* comprises at least a subgroup of wireless devices, e.g. wireless devices 120*a-c*, disconnected from the first base station 110*a*. These may be in an idle mode or sleep mode, as discussed above and may thus before occurrence the future event be fully or partly invisible to the first wireless communications system 100*a*, as also discussed above. The future load may comprise traffic resulting from said subgroup connecting or at least attempting to connect to the first base station 110*a* in response to occurrence of said future event.

The first group of wirelesses devices 120*a-d* may thus and advantageously comprise all or at least a major part of all wireless devices that correspond to MTDs located in the first cell 115*a*.

Details on how the first group of wireless devices 120*a-d* may further be grouped together, e.g. identified and/or estimated, and thereafter e.g. be able to produce the information about the future load they may generate, will be discussed separately below under headline "The first group of wireless devices". However, in conclusion, the first group of wireless devices 120*a-d* may have been grouped together based on one or more of the following:

Information provided by at least some of the wireless devices 120*a-d* of the first group during registration regarding the first cell 115*a*. For example, during deployment and/or installation at a location in the first cell 115*a*, any of the wireless devices 120*a-d*, e.g. a MTD being a wireless sensor, will typically connect to the first base station 110*a* and the first wireless communications system 100*a* e.g. for testing purposes or verification of the installation. During this procedure the wireless device may identify itself as being of a type that e.g. is an MTD type and the first wireless communications system 100*a* may register this as well as e.g. identity of the wireless device, the cell, time etc.

That the last known registrations of at least some of the wireless devices 120*a-d* of the first group were with regard to the first cell 115*a*. For example, wireless devices 120*a-d* that only, or at least for a longer period of time, only has been connected to and registered with the first wireless communications system 100*a* from one location, e.g. the first cell 115*a* or a location associated with the first cell 115*a*, may be assumed to stationary and belong to the first group.

Previous traffic generated by at least some of the wireless devices 120*a-d* of the first group when connected to the radio communications network 100*a*. For example, certain traffic patterns may be identified as being typical for MTDs or certain subgroups of MTDs and be used to associated such wireless devices with the first group.

Further information on how the future load may be estimated will be provided below.

Note that the information about the future load may be obtained in a number of different ways according to embodiments herein, e.g. received and/or obtained internally, depending on type of first wireless communications system 100*a*, which node or nodes thereof that are involved in obtaining the information about the future load and from where. The latter is in turn dependent on from which node or nodes the information about the future load is available from and the type of information. However, in most cases the information about the future load to be obtained is based on some initial information originating from the individual wireless devices 120*a-d* of the first group. This is illustrated in FIG. 2 by dashed arrows originating from the first group of wireless devices 120*a-d* and ending with the first network node 140*a*. The initial information may pass via, and/or be processed by, and/or be supplemented with additional information provided by, the first base station 110a and/or the first managing node 140a.

Action 202

The first network node 140a may determine whether the future load is sufficiently large to be taken into account or not.

Sufficiently large to be taken into account may be determined in relation to an estimated or measured load of radio traffic in the first cell 115a. The estimated or measured traffic load may exclude said future load, and/or may be determined in relation to a capacity of the first base station 110a for serving the first cell 115a. For example, in case of embodiments where the first group of wirelesses devices 120a-d comprises only or at least a subgroup of wireless devices, e.g. wireless devices 120a-c, that are disconnected from the first base station 110a, a present load in the first cell may be estimated or measured. Such present load will exclude, at least to some extent, said future load. The present load may be estimated or measured based on information originating from connected wireless devices in the first cell 115a, including e.g. the first group of wireless devices 121a-b. Retrieval of information regarding the estimated or measured load is illustrated in FIG. 2 by dashed arrows to Action 202 which arrows are originating from each one of the wireless devices 121a-b of the second group. The information may pass via, and/or be processed by, and/or be supplemented with additional information provided by, the first base station 110a and/or the first managing node 140a. Further details on how information regarding load may be communicated will also be discussed separately, see below under headline "Load considerations".

The estimation or measurement may be over a period of time, and e.g. correspond to an average, or normal, load mainly from more conventional wireless devices associated with human users, such as the wireless devices 121a-b of the second group. If this load plus the future load is at or above, or, at or above a certain margin below, a maximum load that may be handled in relation to the capacity of the first cell 115a without causing congestion in or overloading the first cell 115a, then it may be determined that the future load is sufficiently large to be taken into account. In some embodiments, a simpler approach may be taken, where the future load is simply compared to the maximum capacity of the first cell 115a and if over a certain percentage of the maximum capacity, then it may be determined that the future load is sufficiently large to be taken into account.

Figure 4:
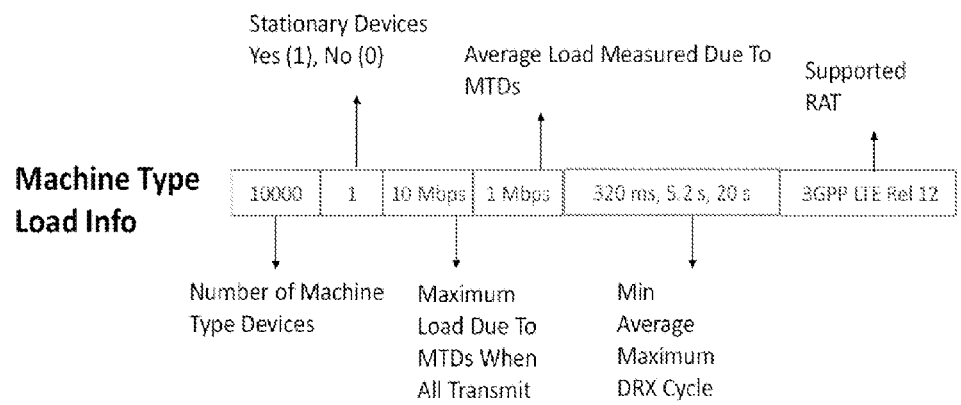
FIG. 4 shows an example of a message that may be used for exchange of information regarding MTDs.

Further details on how it may be determined that the future load is sufficiently large to be taken into account will be discussed separately, see below under headline "Load considerations" and also FIG. 4 with related text.

Action 203

The first wireless communications system 100a provides, based on the obtained information in Action 201, a change of serving cell so that at least one wireless device, e.g. the wireless device 121a, of the second group of one or more wireless devices 121a-b, that are served in the first cell 115a by the first base station 110a, instead become served in the second cell 135a by the second base station 130a. In case of the second wireless communications system 100b, the at least one wireless device instead become served in the second cell 135b by the first base station 110b.

The change of serving cell may involve a so called handover, which is a concept well known to the skilled person within wireless communications systems, of the at least one wireless device, e.g. the wireless device 121a, from being served in the first cell 115a or 115b by the first base station 110a or 110b, to instead be served in the second cell 135a or 135b by the second base station 130a or the first base station 110b.

In some embodiments the second group may simply comprise all wireless devices that are served in the first cell 115a by the first base station 110a, i.e. connected wireless devices. Typically wireless devices of the first group are excluded in the second group, as illustrated in FIGS. 1a-c. However, in case the second group comprises wireless devices that are served in the first cell 115a by the first base station 110a, i.e. connected wireless devices in the first cell 115a, then there may be some wireless devices in the second group that are also part of the first group since some wireless devices of the first group, at least occasionally, may be connected to the wireless communications system. For example, the wireless devices 120d, shown with an arrow illustrating connection with the first base station 110a, may in some embodiments be a wireless device that belong to both the first and second group. However, in some embodiments the second group may only comprise wireless devices that are not part of the first group and in such case a wireless device located in the first cell will either belong to the first group or the second group or to no group at all.

For embodiments mentioned above where the first base station 110a serves the first cell 115a according to a first RAT, and the second base station 130a or the first base station 110b serves the second cell 135a or 135b according to a second RAT that is different from the first RAT, the second group may comprise wireless devices that supports at least both the first RAT and the second RAT, e.g. both LTE and WiFi, This is for example the case for most smart phones of today, and also many tablet computers. In case of these embodiments, the first group may comprise wireless devices that only support the first RAT, or at least do not support the second RAT and that may have been identified as such, e.g. during a previous registration with the wireless communications system.

In some embodiments where Action 203 is carried out, the provision of the change of serving cell is in response to determination that the future load is sufficiently large to be taken into account.

Further, in some embodiments, the provision of the change of serving cell is accomplished by configuring a load balancing algorithm so that said future load s taken into account by the load balancing algorithm. This may in some cases simply be accomplished by adding an offset to an input of an existing load balancing algorithm, as will be discussed in some further detail separately, see e.g. below under headline "Load considerations" and also FIG. 4 with related text.

Moreover, in some embodiments, the provision of the change of serving cell is in response to a determination by the first wireless communications system 100a that the second base station 130a, or the first base station 110b, has free capacity for the change. For example, if the second cell 135a or 135b is already fully loaded or at least so loaded that it is not considered to have free capacity for the change of serving cell, which would result in one or more additional wireless devices being served in the second cell 135a or 135b, no change of serving cell may take place.

Also, in some embodiments, the provision of the change of serving cell is in response to receipt by the first wireless communications system 100a of a signal specifically identifying occurrence of said future event. Such signal may comprise so called Earthquake and Tsunami Warning System (ETWS) information, although it should be noted that there may also be other events handled in a similar manner.

Signals of this type are typically prioritized and may constitute a very early warning or indication, before e.g. wireless sensors react on consequences from occurrence of the future event. In e.g. LTE, ETWS information may make an eNB, e.g. corresponding to the first base station 110a, to transmit one or more so called paging messages to wireless devices in a cell that the eNB serves, e.g. corresponding to the first cell 115a, for making the wireless devices wake up from idle mode. The wireless devices may include e.g. the wireless devices 120a-d of the first group.

In some embodiments the provision of change of base station according to Action 203 involves identity/ies of the wireless device/s subject to the change, e.g. wireless device 121a. This may e.g. be the case in embodiments where the first network node 140a is comprised in or corresponds to the first managing node 111a or the first base station 110a. However, in some embodiment the provision of change of base station according to Action 203 may simply involve sending a command to a suitable other node, e.g the first managing node 111a and/or the first base station 110a, commanding to initiate change of serving base station of all or a certain amount of wireless devices belonging to the second group to the extent possible, and which may be performed until further notice or until a certain condition is fulfilled. It may then be up to the first managing node 111a and/or the first base station 110a to decide and select which exact wireless devices of the second group to be subject for the change of serving base station. For example, the first base station 110a and/or the first managing node 111a may be informed by wireless devices served in the first cell 115a, and in particular such belonging to the second group, including e.g. wireless device 121a, that they are located in the second cell 135a and e.g. supports the RAT thereof. Based on this information the first base station 110a and/or the first managing node 111a may decide to initiate the change of serving cell from the first cell 115a to the second cell 135a for such wireless devices.

Figure 2:
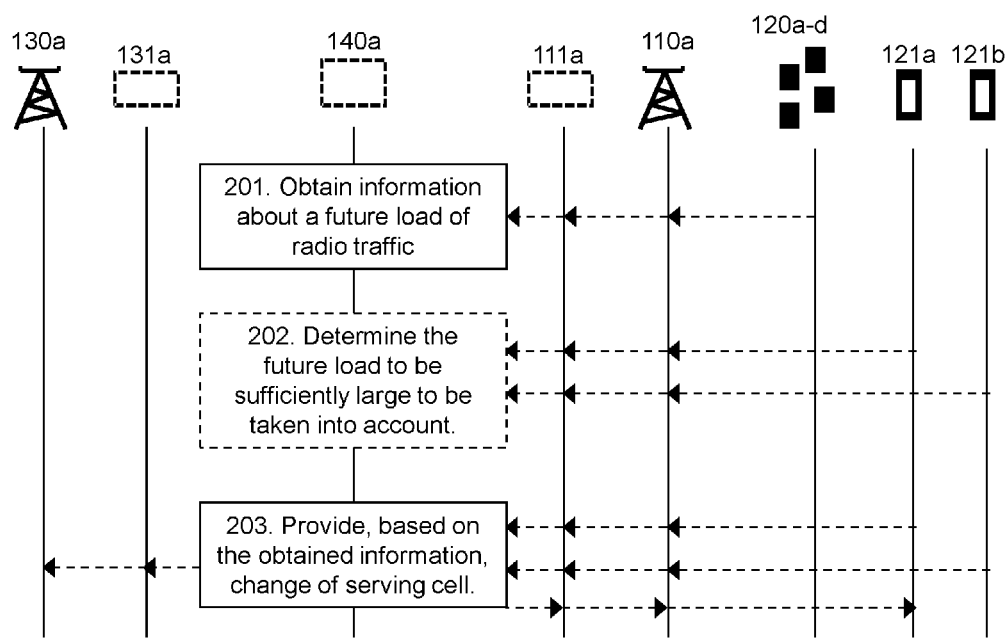
FIG. 2 is a combined signaling diagram and flowchart schematically illustrating an example method according to embodiments herein.

To illustrate that at least some node or nodes of the first wireless communications system 100a, e.g. the first network node 140a, the first managing node 111a and the first base station 110a may need knowledge about wireless devices of the second group which wireless devices will be subject for the change of serving cell, dashed arrows have been drawn in FIG. 2 to from the wireless devices 121a-b of the second group to said nodes. Also, in embodiments where this knowledge reaches e.g. the first network node 140a, transfer of this knowledge will typically pass via at least the first base station 110a, which said arrows also illustrate.

Similarly, since provision of change of serving base station typically will involve information, e.g. one or more commands, to be sent to at least the already serving base station, i.e. here the first base station 110a, and/or the new serving base station, i.e. here the second serving base station 130a, dashed arrows have been drawn from the first network node 140a in Action 302 to the base stations 110a, 130a, and from the first base station 110a also to the wireless device 121a. The wireless device 121a here exemplifies a wireless device of the second group that is subject for the change. Change of serving base station typically requires a command to be sent by the already serving base station to the wireless device that is subject to the change. However, note that in some embodiments the provision of change of base station according to Action 203 may involve sending a command to the first base station 110a that in turn may initiate contact with the second base station 130a in order to carry out the change of serving cell, e.g. via handover to the second base station 130a. Also note that in some embodiments where e.g. the first network node 140a is comprised in or corresponds to the first base station 110a, the provision of change of serving base station according to Action 203 may be carried out internally and need not involve any sending of information at all, although typically at least information exchange with the second base station 130a is required.

It should be realized that exactly how and what kind of information that may needs to be sent and to where for the provision of change of serving base station according to Action 203 typically depends on the technologies involved, in particular the RAT or RATs involved.

At least for embodiments herein involving more complex information exchange and/or decision making, as will be discussed in greater detail below, it may be desirable, or even needed for implementation reasons, to involve multiple nodes for carrying out the method according to embodiments herein. For example, for embodiments herein taking into account information about the first group of wireless devices and their estimated future load in order to determine whether the future load should be taken into account or not, this may be taken care of by a node associated with a RAT of the first base station 110a, e.g. the first managing node 111a. In case these embodiments are also taking into account information about a load situation in the second cell, before providing the change of serving base station, this may be taken care of by another node associated with a RAT of the second base station 130a, e.g. the second managing node 131a. It may then be any of these nodes, or e.g. a third node, that provides the change of serving base station. However, in most cases the method according to embodiments herein will be carried out in a single network node, and for some embodiments there may even be no other option than to do so. Still, it should be noted that the method in some embodiments may be performed distributed among nodes of the first wireless communications system 100a.

Also note that, in the example above in connection with FIG. 2, the method was performed by the first network node 140a, but that it in some embodiments instead may be performed by e.g. the first managing node 111a, the second managing node 131a, the first base station 110a, or the second base station 130a.

As realized from the above, embodiments herein may involve information exchange between two or more network nodes, e.g. the first base station 110a and/or the first managing node 111a, exchanging information with e.g. the second base station 130a and/or the second managing node 131a regarding for example MTDs, load situation in the first cell 115a and/or second cell 135a, and/or at least regarding the change of serving base station. The exchanged information may then be used to steering wireless devices of the second group to be served in the second cell in order to e.g. improve service quality and/or network resource usage while taking into account the future event and radio traffic the first group of wireless devices 120a-d, e.g. MTDs, may generate in response thereto. The information may relate to:

Type of RAT(s) supported by the wireless devices involved, e.g. wireless devices 120a-d and 121a-b.

Total number of the first group of wireless devices, such as MTDs, e.g. wireless devices 120a-d, in the first cell 115a.

Transmission characteristics of the of the first group of wireless devices, e.g. whether it is periodic or event triggered, intervals between transmission, the amount of data per transmission and/or importance of the data, etc.

Radio link quality from the first group wireless devices, such as MTDs, e.g. wireless devices 120a-d, to the first base station 110a.

The First Group of Wireless Devices

The following are examples on how information used in embodiments herein may be obtained and maintained by network nodes involved, in particular with regard to the first group of wireless devices according to embodiments herein, such as the wireless devices 120a-d. The wireless devices of the first group are in the following named MTDs. Deployment of the MTDs typically involves at least an initial connection with the wireless communications system to be established, thereafter the MTDs may enter a state where they are fully or partly invisible to the wireless communications system as discussed above. After the MTDs have been deployed they may start communicating with one or more serving nodes of the wireless communications system, e.g. the first base station 110a and/or first managing node 111a. The serving node may distinguish MTDs from other devices by e.g. detecting special signaling from the MTD during connection establishment, or by recognizing certain transmission patterns from the MTDs. Also, MTDs may transmit their terminal type, or "class", which may indicate that this entity is an MTD. If this e.g. is sent during the initial connection, the information may be remembered by the wireless communications system. Proposals in this regard have been made within 3GPP and may eventually become part of the standard, see e.g. 3GPP TS 22.368, version 11.6.0, chapter 7.1.1, stating i.a. "The network shall provide mechanisms to handle MTC Devices and applications on MTC Devices registering on the IP multimedia core network subsystem and accessing its capabilities including interaction with IMS application servers/enablers."

Moreover, detailed information about the MTDs, e.g. supported RATs and transmission characteristics, may be either signaled to the serving node(s) from the MTD, be preconfigured in or received by serving node(s) based on information and/or from e.g. operators or other sources. Such detailed information may be signaled to the network either by using existing Radio Resource Control (RRC) messages, such as RRC Connection Request, UE Capability Information, UE Information Response, as known in the context of LTE, or by some new specific massage for this, e.g. appositely defined RRC message. New IEs in any such message may comprise among others, e.g. a UE type or class identification, e.g. "machine type device", supported RATs, a typical/average message size being reported, a typical/average Discontinuous Receive (DRx) cycle, information on a mobility pattern, e.g. stationary or not, of the MTD.

Once a connection has been established with a MTD, the serving node(s) may also get knowledge of radio link quality to the MTD by measuring signal quality from the MTD. Since a large percentage of MTDs may be stationary, it may not be required to update MTD information so frequently. When it has been gathered initially for a MTD it may be considered to remain the same, at least until e.g. the MTD may connect again at a later point in time and some relevant change in the MTD information is identified.

Knowledge of the stationary nature of MTDs may be signaled to the wireless communications system, or detected by the wireless communications system, according to existing signaling methods. Maintenance of previously gathered MTD information may e.g. be sufficient on an hourly or daily basis.

Information about the first group of wireless devices according to embodiments herein, such as the wireless devices 120a-d located in the first cell 115a, may be utilized in different ways. As above, the wireless devices of the first group are in the following named MTDs. Given the knowledge about MTDs in the first cell 115a, radio traffic in the first cell 115a may be steered in a proactive manner to the second cell 135a, e.g. in order to improve service quality of other wireless devices, e.g. the wireless device 121a of the second group of wireless devices, and/or reduce the risk for congestion in the first cell 115a owing to radio traffic the MTDs may generate in case of occurrence of the future event. One example may be to preserve a certain amount of capacity for the MTDs in the first cell 115a, or to apply an extra offset to a load balancing algorithms, that may already be in place, in order to reduce a probability of transmission blockage of important data from the MTDs. If some MTDs, which e.g. support only LTE or at least not a RAT of the second cell 135a, such as WiFi, will transmit information of importance triggered by occurrence of the future event, e.g. being a fire or earthquake, it will be beneficial to steer other traffic to the second cell 135a that may be of a another RAT, e.g. more aggressively to increase access probability of the MTDs to the first wireless communications system 100a.

A future event in the form of a big fire or earthquake may trigger a lot of MTDs at approximately the same time in one and the same cell, e.g. the first cell 115a. This combined with massive deployment of MTDs within an area including the cell, and the amount of connections & traffic this may generate, results in a potentially great problem that embodiments herein offer a solution to.

Load Related Considerations

Here, among other things, an algorithm that may be executed for load distribution between the first cell 115a served by the first base station 110a and the second cell 135a served by the second base station 135a, will be discussed. In the following the first cell 115a and the first base station may be referred to as RAT1, implying that they are of a first RAT, and the second cell 135a and the second base station 130a may be referred to as RAT2, implying that they are of second RAT. Although this is not the case for all embodiments herein, it may further be assumed that RAT1 and RAT2 are different RATs. For example, it may be assumed that RAT1 is LTE-based, e.g. according to 3GPP LTE Advanced (& beyond), and that RAT2 is WiFi-based, e.g. according to IEEE 802.11. It may further be assumed that the first group of wireless devices, e.g. wireless devices 120a-d support only one RAT, in this example RAT1.

In terms of load, four cases may be identified if it is assumed that RAT1 and RAT2 respectively may either be i) highly loaded, or fully loaded, or ii) medium to low loaded, the latter implying that there are available resources:

I. RAT 1 highly (or fully) loaded|RAT 2 medium or low loaded

II. RAT 1 highly (or fully) loaded|RAT 2 highly (or fully) loaded

III. RAT 1 medium or low loaded|RAT 2 medium or low loaded

IV. RAT 1 medium or low loaded|RAT 2 highly (or fully) loaded

Note that for the principle to be discussed, exact limits for high, medium or low loaded are not important. In a practical situation, the skilled person will be able to apply suitable limits taking into account particulars given by the circumstances. Before discussing these four cases further and how they may relate to embodiments herein, the concept of load and how measures or estimates of load may be communicated will first be discussed, mainly in the context of LTE.

There are many different definitions of load. In generic terms a radio interface load is a measure of radio resources currently used/occupied at a radio interface. The radio traffic load discussed above may be a radio interface load. In general a measurement or estimate of load, such as in a cell of a wireless communications system, gives an indication of the available resources for accommodating new users in the cell. An example of radio interface load may be found in 3GPP TS 36.423, version 11.6.0, where radio resource usage and available capacity is discussed.

The following are different Information elements (IE) that may be used for communicating load related information:
"Radio Resource Status", see e.g. 3GPP TS 36.423, version 11.6.0, section 9.2.37. This IE indicates the percentage of used radio resources compared to total radio resources. In E-UTRAN, the radio resource every time slot comprise physical resource blocks (PRBs). The usage is separated for uplink and downlink radio resources.
"Composite Available Capacity Group", see e.g. 3GPP TS 36.423, version 11.6.0, section 9.2.44. This IE indicates the overall available resource level in the cell in Downlink and Uplink. This is another example of a IE for communication a measure that is directly related to load and to the number of available resources at the radio interface. It's an indicator of available resource level, and may be exchanged between network nodes as input to load balancing algorithms. The measure measurement is also linked to the number of available E-UTRAN resources, hence to PRBs.
"Composite Available Capacity", see e.g. 3GPP TS 36.423, version 11.6.0, section 9.2.45. This IE indicates the overall available resource level in the cell in either DL or UL.
"Cell Capacity Class Value", see e.g. 3GPP TS 36.423, version 11.6.0, section 9.2.46. This IE indicates the value that classifies the cell capacity with regards to the other cells. This IE only indicates resources that are configured for traffic purposes.
"Capacity Value", see e.g. 3GPP TS 36.423, version 11.6.0, section 9.2.47. This IE indicates the amount of resources that are available relative to a total of E-UTRAN resources. This IE may be weighted according to the ratio of cell capacity class values, if available.
"E-UTRAN Cell Load Reporting Response", see e.g. 3GPP TS 36.413, version 11.5.0, section B.1.6. This IE contains response information for inter-RAT cell load reporting, but may can be used for both intra & inter-RAT cell load reporting & balancing. This IE is measured during a given time window and typically the average value during this time is reported. The report content may be given by the Composite Available Capacity group described above.

Other types of radio interface load with different levels of accuracy than offered by the above IEs may also be defined and used. However, independently of radio interface load definition and/or measures thereof and/or how information on load is communicated, the embodiments herein may be used to attempt to steer as much as possible of traffic from wireless devices of the second group, e.g. human centric traffic, towards RAT2 that may not be supported by the first group of wireless devices, e.g. MTDs.

In the first case I) above, in which RAT1 may be fully loaded and RAT2 has available resources, it may be desirable that any MTDs that are served by RAT1 remain (it may be the only option) and that at least some of the wireless devices of the second group, which may be conventional UEs, and that support both RAT1 and RAT2 are moved to RAT2. Without knowledge of the existence of e.g. disconnected and thus invisible MTDs, as discussed above, a conventional load balancing algorithm may have such effect. However, by taking into account knowledge of also invisible MTDs and/or load they may contribute with, more conventional UEs may be moved to RAT2. This may e.g. be accomplished by means of a first offset, that may be named Offset1, that may be applied to a conventional load balancing algorithm that else considers only connected and thus "visible" wireless devices, such as of the second group.

In the second case II) above, in which both RAT1 and RAT2 may be fully loaded, knowledge of existence of e.g. disconnected and thus invisible MTDs, as discussed above, may not result in any change compared to a conventional case of load balancing. However, a margin may be preserved in RAN1 in order to improve accessibility of the first wireless communications system 100a for at least some highly prioritized MTDs that may be disconnected and invisible, e.g. in the form of wireless sensors. These may be highly prioritized because they have critical information to transmit in case of occurrence of the future event. If this case, conventional UEs in RAN1 may experience degraded performance compared to if disconnected and invisible MTDs would be fully ignored.

In the third case III) above, in which both RAT1 and RAT2 are low to medium loaded, then knowledge about e.g. disconnected and thus invisible MTDs may make it desirable to move more conventional UEs than else would be the case to RAT2. This may e.g. be achieved by an offset, that may be named Offset 2, that may be applied to the conventional load balancing algorithm. The second offset, Offset2, may be equal to or different from the first offset, Offset1.

In the fourth case IV), in which RAT1 is medium or low loaded and RAT2 may be fully loaded, the conventional load balancing algorithm may operate as in a conventional case, i.e. any knowledge of e.g. disconnected and thus invisible MTDs may not be utilized in the load balancing.

Hence, in case embodiments herein are implemented by adapting a conventional load balancing algorithm, it may be of interest to check whether RAT2 has available resources to accommodate extra traffic for wireless devices of the second group, e.g. conventional UEs. In case there is availability of resources for this, Offset1 and/or Offset2 may be applied, which may depend on load in RAT1.

Implementation Through Load Balancing Algorithm

Figure 3:
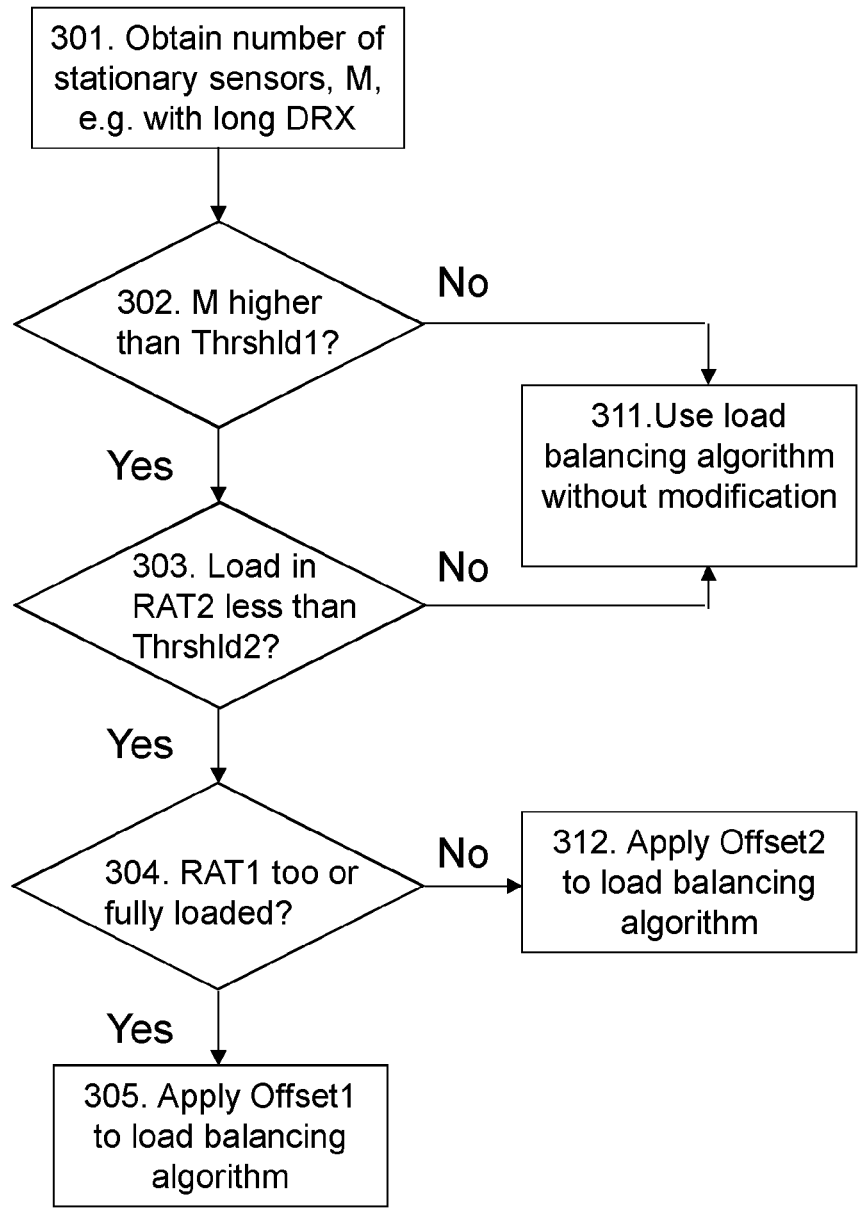
FIG. 3 is a schematic block diagram depicting an example relating to how embodiments herein may be implemented.

FIG. 3 is a schematic block diagram depicting an example in line with the above discussion and showing an example of how embodiments herein advantageously may be implemented by means of load balancing algorithm that, as such, else may be used for more conventional load balancing, such as only taking into account wireless devices, e.g. wireless devices 121a-b, that are connected to the wireless communications system. The algorithm may thus be an existing load balancing algorithm but that is configured differently than in a conventional situation and thereby may contribute to implementing embodiments herein.

In action 301, a number, M, of wireless devices, e.g. MTDs, that may be considered stationary and may have long cycles for checking after paging messages, are estimated and/or measured to be present in a cell, e.g. the first group of wireless devices 120a-d in the first cell 115a. The estimation and/or measure may comprise detecting mobility patterns and/or getting feedback regarding wireless devices, e.g. MTDs, on their mobility pattern that e.g. may be derived from historical data reflecting served cells.

In action 302 the number M is compared to a first threshold, typically represented by an integer value. If e.g. M is higher than the first threshold, which may indicate that there is a significant amount of MTDs present, action 403 is executed. If not, an action 311 is executed, which involves executing a load balancing algorithm without modification, i.e. conventionally.

In action 303 it is checked if the load in RAT2, e.g. in the second cell 135a, which may be according to a RAT not supported by the first group of wireless devices, is less than a second threshold, Thrshld2. If less than the second threshold, this may indicate that there is free capacity in RAT2, e.g. WFi based, to accommodate one or more wireless devices, e.g. wireless device 121a, if these change serving base station, and action 404 is executed. If not less than the second threshold, RAT2 may be considered too loaded and the action 311 may be executed.

In action 304, executed in case the load of RAT2 is less than the second threshold, it is checked if RAT1, e.g. based on LTE, is too or fully loaded. If RAT1 is too or fully loaded, then action 405 is executed. the first offset, Offset1 is applied to the load balancing algorithm. If RAT1 is not too or fully loaded, then an action 312 is executed that involves applying the second offset, Offset2, to the load balancing algorithm, corresponding to case III) above.

In action 305, executed in case RAT1 is too or fully loaded, the first offset, Offset1, is applied to the load balancing algorithm. This corresponds to case I) above.

Action 411 may thus be carried out for cases II) or IV) above.

In some embodiments, a number of MTDs, typically stationary and fully or partly invisible, as discussed previously, to the wireless communications system, e.g. the first wireless communications system 100a, may be located within a common coverage area served by both the first base station 110a and another, third base station (not shown) that may be of the same RAT, e.g. an LTE-based RAT, as the first base station 110a. It may then be desirable that the first base station 110a and the third base station, and/or e.g. managing nodes thereof, exchange information regarding the MTDs for load balancing purposes. Note that in some embodiments, e.g. when the second base station 130a is of the same RAT as the first base station 110a, the third base station may be the second base station 130a. In this case e.g. the wireless device 120c in FIGS. 1a-c may be an example of an MTD located in common coverage area. For example, the first base station 110a and the third base station may be neighbor nodes, eNBs in case of LTE, and the communication interface between them may then be X2 or S1. A message for exchange of information regarding the MTDs may then be of the type shown in FIG. 4 and/or comprise corresponding type of information. Such information may be useful for more conventional load balancing as well. FIG. 4 thus shows and example of an X2 and/or S1 message with machine type load information.

Typically load balancing between RATs or even cells within the same RATs is done by: i) First checking the quality, typically based on received signal strength level, from the different RATs or cells. In case the link quality is acceptable, e.g. above a given threshold level, then, ii) the loads in the neighbor cells or RATs are compared. At a generic level, in case the load in neighbor RATs is say Load1 and Load2 respectively, then a formula applied per wireless device in the common coverage area may be expressed as: Move wireless device A to RAT2 from RAT1 if $$\text{Load2} \leq \text{Load1} - \text{Margin} \qquad (1),$$

where Margin is any kind of value, even zero, depending on the target of the load balancing algorithm. In case of steps 305, or 312 in FIG. 3, then formula (1) may instead be written as:

$$\text{Load2} \leq \text{Load1} - \text{Margin} + \text{Offset} \qquad (2),$$

where Offset is a positive value and e.g. may take values of either Offset1 or Offset2 in FIG. 3. These two offset values can be the same, but it typically makes more sense if Offset1 is higher than Offset2.

It may be noted that load measurements or estimates and reporting thereof may be accomplished with the help of IEs as exemplified above, resulting in report of the Load1 and Load2 as quantities that may include the average impact on a cell load, e.g. load in the first cell 115a, resulting from radio traffic from MTDs, such as the wireless devices 120a-d of the first group. However, due to the sporadic nature and the low data rate of such radio traffic, such measurement may not be sufficient for indicating a relevant load in case of occurrence of the future event that may be extraordinary. The above offsets may be used to compensate for this. The offsets will thus have effect of offload RAT1 more, by steering traffic to RAT2, than else would be the case and hence maintaining more free resources for transmissions from MTDs in case of occurrence of the future event.

Figure 5:
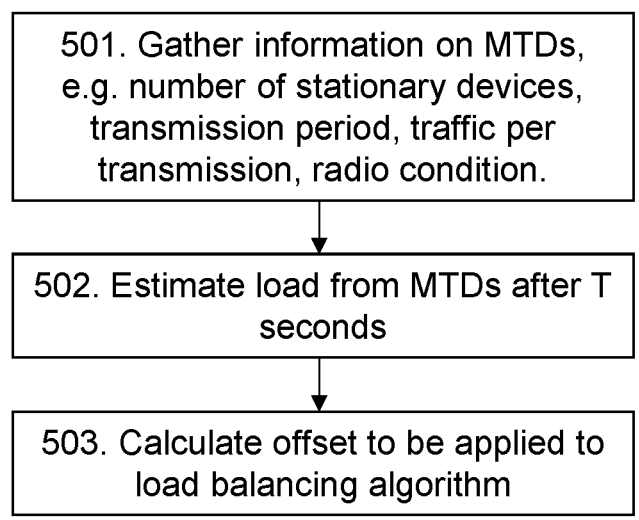
FIG. 5 is a flow chart schematically illustrating how a load balancing algorithm may be configured in implementation of embodiments herein.

The following is an example of how MTD information may be used in load balancing algorithms. In an area with coverage of both RAT1 and RAT2, e.g. with both LTE and WiFi coverage, there may be deployed a large number of MTDs, e.g. the first group of wireless devices 120a-d, that only support LTE. These MTDs, at least those in idle mode, may generate significant amount of traffic periodically, e.g. every minute, and this period might correspond to the DRX cycle mentioned above. Based on this knowledge, a load balancing algorithm may be configured to steer more traffic, e.g. by moving more wireless devices e.g. including wireless device 121a, that support both LTE and WiFi, to RAT2. This in order to reduce the risk that traffic from the MTDs in case of occurrence of the future event won't congest RAT1. FIG. 5 is a flow chart schematically illustrating this and corresponds to an algorithm that may be executed with regard to RAT1 and RAT2 for load balancing. For the sake of simplicity it may be assume that RAT1 is LTE-based and RAT 2 is WiFi based, i.e. based on IEEE 802.11. MTDs, e.g. wireless sensors, may be assumed to support only one RAT, in this example RAT1. In an action 501, a network node, e.g. the first network node 140a, may gather information of MTDs, such as stationary and/or wireless sensors, including e.g. the number of sensors, transmission characteristics, e.g. transmission period and traffic per transmission and radio conditions. In an action 502, the load associated with MTDs in RAT1, e.g. the wireless devices 120a-d, may for a short future, e.g. a period in the domain of some seconds, say during T seconds, be estimated based on the gathered information. In an action 503, the estimated load and/or the gathered information may then be used to produce an offset, e.g. as discussed above, to be applied with a conventional load balancing algorithm in order to take the estimated load, that may correspond to the future load, into consideration. Load from the MTDs are thus taken care of in a proactive way. Hence, a potential congestion due to traffic from the MTDs may be prevented and performance of both MTDs and more conventional wireless devices may be improved.

Hence, in view of the above, it is beneficial if inter RAT load balancing algorithms take into account information regarding existence of MTDs, including e.g. disconnected MTDs, in a cell in order to improve service accessibility of MTDs, and also other more conventional wireless devices, particularly in case of occurrence of future event that would trigger a large amount of the MTDs to connect to the RAT in the cell. This may be accomplished by applying a respective offset to conventional inter RAT load balancing algorithms. Such offset, which may be added to usual load measures as input to the algorithm, may be produced based on information gathered about the MTDs, e.g. the type of RAT(s) supported by wireless device involved, a total number of MTDs and transmission frequency of the MTDs. The goal of the offset is to steer wireless devices that are not MTDs, e.g. more conventional human user centric wireless devise, and/or that support more than one RAT, towards another RAT and/or cell, not supported by or unsuitable for the MTDs. Such an offset may even be necessary in case of a large amount of MTDs and that may support only one RAT, which is a fair assumption since most MTDs are required to be of low cost. In addition, information associated with the MTDs, e.g. their typical stationary nature, may be exploited so as to get estimation of the future load in case of occurrence of the future event that may occur unexpectedly. In case the MTDs are stationary, or static, i.e. remain at more or less the same location all the time, information may be gathered over time so that is become known, or at least a reliable estimate may be provided, of how many MTs are located in a cell. Such information may be used for configuring a load balancing algorithm, e.g. by means of an offset as already mentioned, to accomplish a margin for the future load, which thus may be based on potential traffic from the MTDs, so as to avoid congestion in case of occurrence of the future event.

As WiFi has been mentioned as a typical, or even preferred, example of a RAT of the second base station 130a and the second cell 135a, some characteristics relating to WiFi will be further discussed. WiFi may be used interchangeably with Wireless Local Area Network (WLAN) and typically refers are based on the IEEE 802.11 standards. Using WiFi to offload traffic from other wireless communications systems, e.g. LTE based, ones, is becoming more and more interesting from both the operator's and end users point of view. Some of the reasons for this tendency are:

Additional frequency. By using WiFi, operators may get an additional 85 MHz in the 2.4 GHz band and another (close to) 500 MHz in the 5 GHz band.

Cost. From operator's point of view, Wi-Fi uses unlicensed frequency that is free of charge. On top of that, the cost of Wi-Fi APs, both from Capital Expenditures (CAPEX) and Operating Expenditures (OPEX), i.e. deployment aspects, is considerably lower than that of a 3GPP based base station, typically referred to as BS or eNB. Operators can also take advantage of already deployed APs that are already deployed and available in certain so called hotspots such as train stations, airports, stadiums, shopping malls, etc. Most end users are also currently used to having Wi-Fi for free, or already paid, at home, since home broadband subscriptions are usually flat rate, and for free in many public places.

Terminal support. Almost all more conventional wireless devices, such UEs, including e.g. smartphones and other portable devices currently available in the market usually support WiFi. Not that in the WiFi world, the term Station (STA) may is used for wireless devices and instead of e.g. UE, and as such the terms UE, STA may be used interchangeably.

High data rate. Under low interference conditions and assuming the user is close to a Wi-Fi AP, WiFi may provide peak data rates that outshine that of many current mobile networks. For example, theoretically up to 600 Mbps is possible for IEEE 802.11n deployments with Multiple Input Multiple Output (MIMO).

Figure 6:
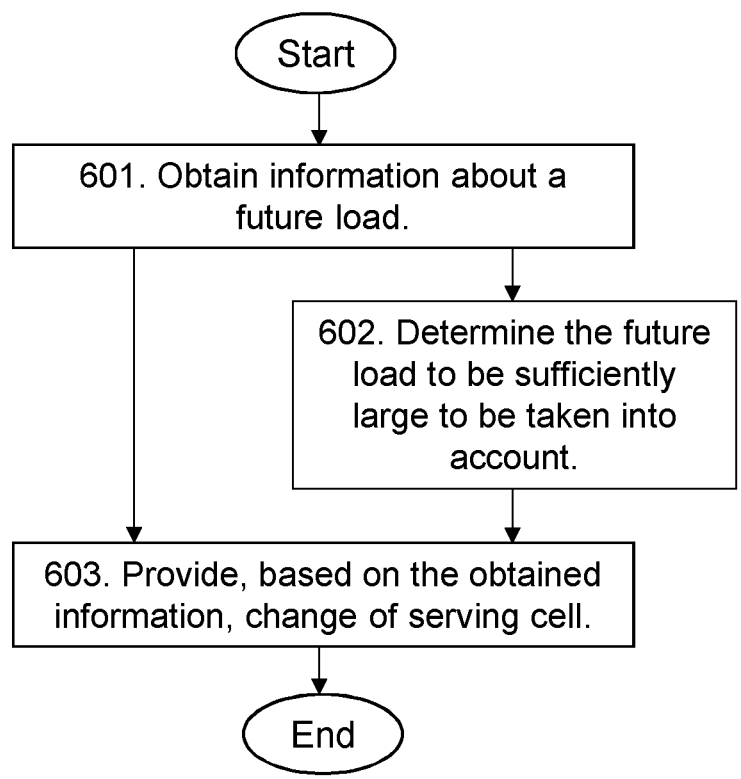
FIG. 6 is a flow chart illustrating a method according to embodiments herein.

Embodiments herein relating to a method in, e.g. performed by, for example the first, second or third wireless communications system 100a-c, for managing radio traffic load in the first cell 115a, 115b or 115c, served by the first base station 110a, 110b or 110c and which first cell 115a, 115b or 115c at least partly is covered by the second cell 135a, 135b or 135c served by a second base station 130a, 130c or the first base station 110b, will now be further elaborated and described with reference to the flowchart depicted in FIG. 6. The first wireless communications system 100a, and nodes and base stations comprised therein, may below mainly used for reference in order not to obscure the text with too many reference numerals in a repetitive manner. However, as should be realized from the above, the first wireless communications system 100a, if not indicated otherwise, may be replaced by any one of the second and third wireless communications systems 100b-c, and the respective nodes and base stations in the first wireless communications system 100a by suitable corresponding nodes and base stations comprised the second and third wireless communications systems 100b-c.

Note that, as been discussed above, in some embodiments the first cell 115a or 115b is served by the first base station 110a or 110b according to a first RAT, and the second cell 135a or 135b, is served by the first base station 110b, or the second base station 130a, according to a second RAT that is different from the first RAT. Also note that, as also been discussed above, in some embodiments, the method is performed by a network node comprised in the first wireless communications system 100a, e.g. by the first network node 140a, the first managing node 111a, the second managing node 131a, the first base station 110a, or the second base station 130a comprised in the wireless communications system 100a.

The method comprises the following actions, which actions may be taken in any suitable order. Further, actions may be combined.

Action 601

The first wireless communications system 100a obtains information about a future load of radio traffic in the first cell 115a, which future load is associated with the first group of wireless devices 120a-d. Generation of the future load is in response to an occurrence of a future event.

In some embodiments, the first group of wirelesses devices 120a-d comprises at least a subgroup of wireless devices, e.g. wireless devices 120a-c, disconnected from the first base station 110a. The future load may comprise traffic resulting from said subgroup connecting or at least attempting to connect to the first base station 110a in response to the occurrence of said future event.

The first group of wireless devices 120a-d may have been grouped together based on one or more of the following: Information provided by at least some of the wireless devices 120a-d of the first group during registration regarding the first cell 115a. That the last known registrations of at least some of the wireless devices 120a-d of the first group were with regard to the first cell 115a. Previous traffic generated by at least some of the wireless devices 120a-d of the first group when connected to the first radio communications network 100a.

This action may fully or partly correspond to the action 201 discussed above.

Action 602

The first wireless communications system 100a may determine whether the future load is sufficiently large to be taken into account or not.

Sufficiently large to be taken into account may be determined in relation to an estimated or measured load of radio traffic in the first cell 115a. The estimated or measured traffic load may exclude said future load, and/or may be determined in relation to a capacity of the first base station 110a for serving the first cell 115a.

This action may fully or partly correspond to the action 202 discussed above.

Action 603

The first wireless communications system 100a provides, based on the obtained information in Action 601, a change of serving cell so that at least one wireless device, e.g. the wireless device 121a, of the second group of one or more wireless devices 121a-b, that are served in the first cell 115a by the first base station 110a, instead become served in the second cell 135a by the second base station 130a. Note that in case of the second wireless communications system 100b, the at least one wireless device instead become served in the second cell 135b by the first base station 110b.

In some embodiments, where Action 602 is carried out, the provision of the change of serving base station is in response to determination that the future load is sufficiently large to be taken into account.

In some embodiments, the provision of the change of serving cell is accomplished by configuring a load balancing algorithm so that said future load is taken into account by the load balancing algorithm.

Moreover, in some embodiments, the provision of the change of serving cell is in response to a determination by the first wireless communications system 100a that the second base station 130a, has free capacity for the change. In the case of the second wireless communications system 100b, the determination is instead by the second wireless communications system 100b that the first base station 110b has free capacity for the change.

Furthermore, in some embodiments, the provision of the change of serving cell is in response to receipt by the first wireless communications system 100a of a signal specifically identifying occurrence of said future event.

This action may fully or partly correspond to the action 203 discussed above.

Figure 7:
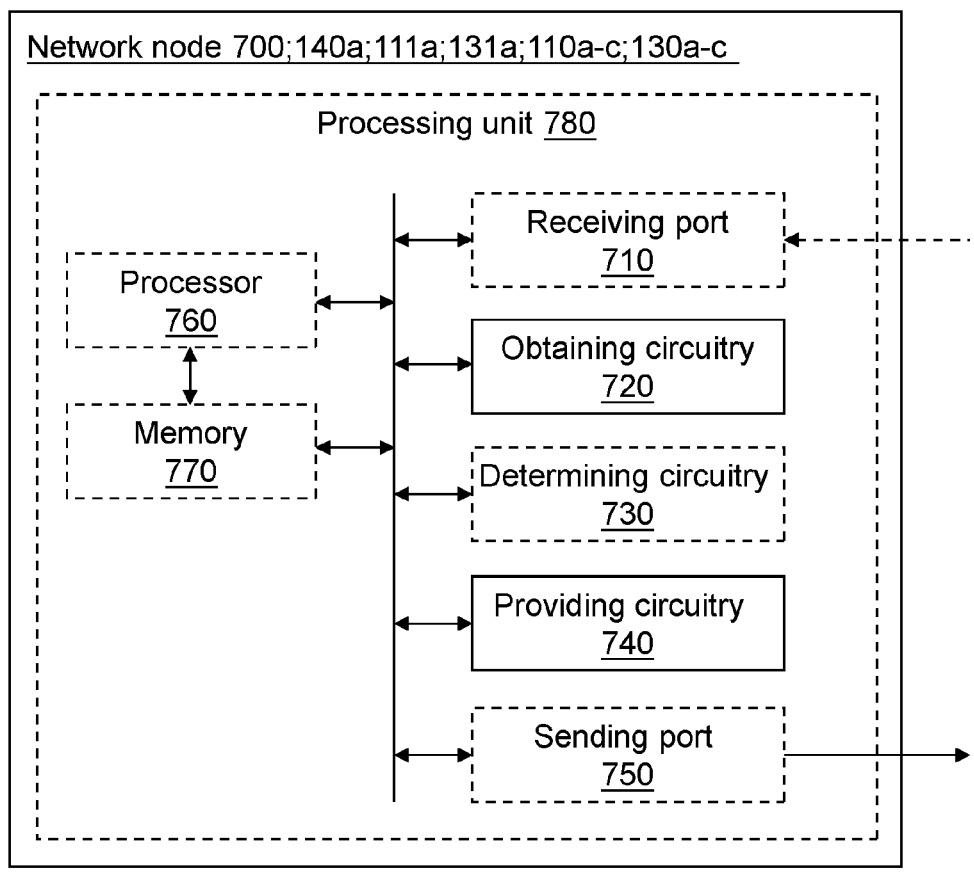
FIG. 7 is a schematic block diagram illustrating a network node according to embodiments herein.

To perform the actions 601-603 above for managing radio traffic load in the first cell 115a,115b or 115c served by the first base station 110a, 110b or 110c, a network node 700 may comprise an arrangement schematically depicted in FIG. 7. The network node 700 may e.g. comprise or correspond to any of the first network node 140a, the first managing node 111a, the second managing node 131a, the first base station 110a, the second base station 130a.

The network node 700 may comprise a receiving port 710 that generally may be configured to receive information from and be involved in communication with one or more other network nodes and/or devices when this may be needed or desirable, for example the wireless devices 120a-d, 121a-b, the base stations 110a, 130a, the managing nodes 111a, 131 *a*. Moreover, the receiving port may be specifically configured to receive said signal specifically identifying occurrence of said future event.

The network node 700 comprises an obtaining circuitry 720, configured to obtain the information about the future load of radio traffic in the first cell 115a, which future load is associated with the first group of wireless devices 120a-d and generation of the future load is in response to an occurrence of a future event.

In some embodiments, the network node 700 further comprises a determining circuitry 730, configured to determine whether the future load is sufficiently large to be taken into account or not. The determination circuitry 730 may be further configured to determine whether the first base station 110b, or the second base station 130a, has free capacity for the change of serving base station or not.

The network node 700 further comprises a providing circuitry 740, configured to provide, based on the obtained information, the change of serving cell so that at least one wireless device, e.g. wireless device 121a, of a second group of one or more wireless devices 121a-b that are served in the first cell 115a by the first base station 110a instead become served in the second cell 135b by the first base station 110b or in the second cell 135a by the second base station 130a.

The providing circuitry 740 may be further configured to provide the change of serving cell in response to the determination by the determining circuitry 730 that the future load is sufficiently large to be taken into account.

Moreover, in some embodiments, the providing circuitry 740 is further configured to provide the change of serving cell in response to determination by the determining circuitry 730 that the first base station 110b or the second base station 130a has free capacity for the change of serving cell.

The network node 700 may further comprise a sending port 750 configured to send information to and be involved in communication with other network nodes and/or devices when this may be needed or desirable, for example the wireless devices 120a-d, 121a-b, the base stations 110a, 130a, the managing nodes 111a, 131a.

The embodiments of the apparatus 700 may be fully or partly implemented through one or more processors, such as a processor 760 depicted in FIG. 7, together with computer program code for performing the functions and actions of embodiments herein. In some embodiments the circuitry discussed above may be fully or partially implemented by the processor 760.

The computer program code mentioned above may also be provided as a computer program product, for instance in the form of a data carrier carrying computer program code for performing the embodiments herein when being loaded into the in the network node 700. One such carrier may be in the form of a CD or DVD. It is however feasible with other data carriers such as a memory stick, memory card or hard drive. The computer program code may furthermore be provided as pure program code on a server for download to the network node 700.

The computer program code may furthermore be provided in the form of a data file or files on, or available through, a server for download. The file or files may be executable files for direct or indirect download to and execution on the network node 700, or may be for intermediate download and compilation to make them executable before download to and for execution in the network node 700. The server may be accessible over a computer network, such as the Internet, and may e.g. be a web or ftp server.

The network node 700 may further comprise a memory 770 comprising one or more memory units. The memory 770 is arranged to store data, such as configurations and/or applications to perform the method when being executed in the network node 700.

Those skilled in the art will also appreciate that the ports and circuitry 710-750 may refer to a combination of analog and digital circuits, and/or one or more processors configured with software and/or firmware (e.g., stored in memory) that, when executed by the one or more processors such as the processor 760, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

In some examples, the network node 700 may comprise a processing unit 780, which may comprise one or more of the circuit(s) and/or port(s) mentioned above. As used herein, the term "processing circuit" may relate to a processing unit, a processor, an application specific integrated circuit (ASIC), a field-programmable gate array (FPGA) or the like. As an example, a processor, an ASIC, an FPGA or the like may comprise one or more processor kernels. In some examples, the processing circuit may be embodied by a software and/or hardware module. Any such module may be a determining means, estimating means, capturing means, associating means, comparing means, identification means, selecting means, receiving means, transmitting means or the like as disclosed herein. As an example, the expression "means" may be a unit, such as a determining unit, selecting unit, etc.

As used herein, the term "memory" may refer to a hard disk, a magnetic storage medium, a portable computer diskette or disc, flash memory, random access memory (RAM) or the like. Furthermore, the memory may be an internal register memory of a processor.

Attention is again drawn to that for convenient presentation in the foregoing mainly the first wireless communications system 100a, and nodes and base stations comprised therein, have been used in the examples. However, as already mentioned, in the foregoing examples references to the first wireless communications system 100a may be replaced by any one of the second and third wireless communications system 100b-c, and nodes and base stations comprised in the first wireless communications system 100a may then be replaced by suitable corresponding nodes and base stations in the second or third wireless communications system 100b-c.

In the above description of embodiments herein, e.g. LTE and WiFi are particularly mentioned. It should however be noted that embodiments herein are not dependent on only these RATs, but may in general be applied to any technology, although the embodiments herein may have certain advantages in the context of certain technologies, such as WiFi, as discussed in the foregoing.

As used herein, the expression "configured to" may mean that a processing circuit is configured to, or adapted to, by means of software or hardware configuration, perform one or more of the actions described herein.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and encode the transmission. In case of group-casting, a group of specifically addressed devices may receive and decode the transmission.

When using the word "comprise" or "comprising" it shall be interpreted as non-limiting, i.e. meaning "consist at least of".

Even though embodiments of the various aspects have been described, many different alterations, modifications and the like thereof will become apparent for those skilled in the art. The described embodiments are therefore not intended to limit the scope of the present disclosure.

The invention claimed is:

1. A method, in a wireless communications system, for managing radio traffic load in a first cell served by a first base station, wherein the first cell is at least partly covered by a second cell served by the first base station or a second base station, the method comprising:
    associating a first group of wireless devices with a potential future event;
    obtaining information about a future load of radio traffic in the first cell that is expected to be generated by the first group of wireless devices in response to an occurrence of the potential future event;
    responsive to an occurrence of the potential future event, providing, based on the obtained information, a change of serving cell so that at least one wireless device not in said first group being served in the first cell by the first base station instead becomes served in the second cell by the first base station or the second base station.

2. The method of claim 1, wherein:
    the first group of wireless devices comprises at least a subgroup of wireless devices disconnected from the first base station;
    the future load comprises traffic resulting from the subgroup connecting or attempting to connect to the first base station in response to the occurrence of the future event.

3. The method of claim 1, wherein the provision of the change of serving cell is accomplished by configuring a load balancing algorithm so that the future load s taken into account by the load balancing algorithm.

4. The method of claim 1, wherein the first group of wireless devices has been grouped together based on one or more of the following:
    information provided by at least some of the wireless devices of the first group during registration regarding the first cell;
    that the last known registrations of at least some of the wireless devices of the first group were with regard to the first cell;
    previous traffic generated by at least some of the wireless devices of the first group when connected to the radio communications network.

5. The method of claim 1:
    further comprising determining whether the future load is sufficiently large to be taken into account or not;
    wherein the provision of the change of serving cell is in response to a determination that the future load is sufficiently large to be taken into account.

6. The method of claim 5, wherein sufficiently large to be taken into account is determined in relation to an estimated or measured load of radio traffic in the first cell, which estimated or measured traffic load excludes the future load and/or is determined in relation to a capacity of the first base station for serving the first cell.

7. The method of claim 1, wherein:
    the first cell is served by the first base station according to a first Radio Access Technology (RAT);

the second cell is served by the first base station or the second base station, according to a second RAT that is different from the first RAT.

8. The method of claim 1, wherein the provision of the change of serving cell is in response to a determination by the wireless communications system that the first base station or the second base station has free capacity for the change.

9. The method of claim 1, wherein the provision of the change of serving cell is in response to receipt by the wireless communications system of a signal specifically identifying occurrence of the future event.

10. The method of claim 1, wherein the method is performed by a network node comprised in the wireless communications system.

11. A network node for managing radio traffic load in a first cell served by a first base station; wherein the first cell is at least partly covered by a second cell served by the first base station or a second base station; the network node, first base station, and second base station being comprised in a wireless communications system; the network node comprising:
processing circuitry configured to:
associate a first group of wireless devices with a potential future event;
obtain information about a future load of radio traffic in the first cell that is expected to be generated by the first group of wireless devices in response to an occurrence of a the potential future event; and
responsive to an occurrence of the potential future event, provide, based on the obtained information, a change of serving cell so that at least one wireless device not is said first group being served in the first cell by the first base station instead becomes served in the second cell by the first base station or the second base station.

12. The network node of claim 11, wherein:
the first group of wireless devices comprises at least a subgroup of wireless devices disconnected from the first base station;
the future load comprises traffic resulting from the subgroup connecting or attempting to connect to the first base station in response to the occurrence of the future event.

13. The network node of claim 11, wherein the provision of the change of serving cell is accomplished by configuring a load balancing algorithm so that the future load s taken into account by the load balancing algorithm.

14. The network node of claim 11, wherein the first group of wireless devices has been grouped together based on one or more of the following:
information provided by at least some of the wireless devices of the first group during registration regarding the first cell;
that the last known registrations of at least some of the wireless devices of the first group were with regard to the first cell;
previous traffic generated by at least some of the wireless devices of the first group when connected to the radio communications network.

15. The network node of claim 11:
wherein the network node further comprises determining circuitry configured to determine whether the future load is sufficiently large to be taken into account or not;
wherein the providing circuitry is further configured to provide the change of serving cell in response to the determining circuitry determining that the future load is sufficiently large to be taken into account.

16. The network node of claim 15:
wherein sufficiently large to be taken into account is determined in relation to an estimated or measured load of radio traffic in the first cell;
wherein the estimated or measured traffic load excludes the future load and/or is determined in relation to a capacity of the first base station for serving the first cell.

17. The network node of claim 11, wherein:
the first cell is served by the first base station according to a first Radio Access Technology (RAT);
the second cell is served by the first base station or the second base station according to a second RAT that is different from the first RAT.

18. The network node of claim 11:
wherein the determining circuitry is configured to determine whether the first base station or the second base station has free capacity for the change of serving cell or not;
wherein the providing circuitry is configured to provide the change of serving cell in response to determining circuitry determining that the first base station or the second base station has free capacity for the change of serving base station.

19. The network node of claim 11, wherein the provision of the change of serving cell is further in response to receipt by the network node of a signal specifically identifying occurrence of the future event.

* * * * *